US008427694B2

United States Patent
Sugimoto

(10) Patent No.: US 8,427,694 B2
(45) Date of Patent: Apr. 23, 2013

(54) IMAGE PROCESSING APPARATUS, IMAGE PROCESSING METHOD AND IMAGE PROCESSING PROGRAM PRODUCT GENERATING PROCESSING DATA HAVING CONSISTENT PIXEL DENSITY

(75) Inventor: Kazuki Sugimoto, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 865 days.

(21) Appl. No.: 12/063,862

(22) PCT Filed: Jun. 7, 2007

(86) PCT No.: PCT/JP2007/062060
§ 371 (c)(1),
(2), (4) Date: Feb. 15, 2008

(87) PCT Pub. No.: WO2008/001622
PCT Pub. Date: Jan. 3, 2008

(65) Prior Publication Data
US 2008/0218785 A1    Sep. 11, 2008

(30) Foreign Application Priority Data

Jun. 28, 2006  (JP) ................. 2006-178295
Jun. 1, 2007   (JP) ................. 2007-147353

(51) Int. Cl.
*G06K 15/00* (2006.01)
(52) U.S. Cl.
USPC ............ 358/1.18; 358/1.9; 358/2.1; 382/176; 382/239; 382/254
(58) Field of Classification Search .............. 358/1.18, 358/1.9, 2.1; 382/176, 239, 254
See application file for complete search history.

(56) References Cited

U.S. PATENT DOCUMENTS

| | | | |
|---|---|---|---|
| 4,135,212 A | | 1/1979 | Pugsley et al. |
| 5,991,458 A | * | 11/1999 | Kunitake et al. ............... 382/254 |
| 6,549,307 B1 | * | 4/2003 | Makishima et al. .......... 386/327 |
| 6,735,341 B1 | | 5/2004 | Horie et al. |
| 2001/0043263 A1 | * | 11/2001 | Sasanuma et al. ............ 347/251 |
| 2004/0105129 A1 | | 6/2004 | Kawakami |
| 2005/0088697 A1 | | 4/2005 | Yasutomi et al. |

FOREIGN PATENT DOCUMENTS

| | | |
|---|---|---|
| JP | 7 214825 | 8/1995 |
| JP | 7 236066 | 9/1995 |
| JP | 7 256936 | 10/1995 |
| JP | 9-289588 | 11/1997 |
| JP | 10 93816 | 4/1998 |

(Continued)

*Primary Examiner* — Benny Q. Tieu
*Assistant Examiner* — Martin Mushambo
(74) *Attorney, Agent, or Firm* — Oblon, Spivak, McClelland, Maier & Neustadt, L.L.P.

(57) ABSTRACT

An image processing apparatus configured to generate a printing image for printing document data by a printer, includes a first processing part configured to generate first processing data having resolution different from the resolution with respect to printing order for character data contained in the document data; a second processing part configured to generate second processing data having a pixel density consistent with the pixel density of the first processing data for image data contained in the document data; and a printing image generating part configured to generate printing data by synthesizing the first processing data and the second processing data. The second processing part makes the pixel density of the second processing data consistent with the pixel density of the first processing data by tone conversion of the image data.

10 Claims, 6 Drawing Sheets

FOREIGN PATENT DOCUMENTS

| | | |
|---|---|---|
| JP | 10 329363 | 12/1998 |
| JP | 2000-13611 | 1/2000 |
| JP | 2002 271622 | 9/2002 |
| JP | 2004-180099 | 6/2004 |
| JP | 2005-111899 | 4/2005 |
| JP | 2006 74305 | 3/2006 |
| JP | 2006-103045 | 4/2006 |
| JP | 2006 140970 | 6/2006 |

* cited by examiner

IMAGE PROCESSING APPARATUS, IMAGE PROCESSING METHOD AND IMAGE PROCESSING PROGRAM PRODUCT GENERATING PROCESSING DATA HAVING CONSISTENT PIXEL DENSITY

TECHNICAL FIELD

The present invention generally relates to image processing apparatuses, image processing methods and image processing program products.

More specifically, the present invention relates to an image processing apparatus configured to generate printing images for printing document data by a printer, an image processing method and an image processing program product.

BACKGROUND ART

Improvement of image quality is an extremely important problem in a printing process. Because of this, conventionally and continuously various kinds of techniques have been developed. On the other hand, recently, it has become general practice that various objects such as characters, drawings, and images (pictures or the like) are contained in a single document.

Under this circumstance, there is a tendency that techniques for improving the image quality become more complex. In other words, if image quality of a certain object among the characters, drawings, images, and others has priority, a problem is that image qualities of other objects may be degraded.

For example, Japanese Laid-Open Patent Application Publication No. 7-214825 describes a technique where the independent selection of halftone processing and the independent selection of color correction are individually executed with respect to various color options for text, graphics and photo images.

However, the technique described in Japanese Laid-Open Patent Application Publication No. 7-214825 does not increase resolution and there is a limitation to the improvement of the image quality. For example, jaggy edge may not be effectively removed.

The increase of the resolution and the capability to perform image processing are in conflict with each other. Therefore, if the resolution is simply increased, the capability to perform image processing may be degraded.

DISCLOSURE OF THE INVENTION

Accordingly, in a preferred embodiment of the present invention there is provided a novel and useful image processing apparatus, image processing method and image processing program product solving one or more of the problems discussed above.

More specifically, the embodiments of the present invention may provide an image processing apparatus, image processing method and image processing program product whereby image quality can be improved while degradation of capability of the apparatus to perform image processing is prevented.

According to one aspect of the present invention there is provided an image processing apparatus configured to generate a printing image for printing document data by a printer, including a first processing part configured to generate first processing data having resolution different from the resolution with respect to printing order for character data contained in the document data; a second processing part configured to generate second processing data having a pixel density consistent with the pixel density of the first processing data for image data contained in the document data; and a printing image generating part configured to generate printing data by synthesizing the first processing data and the second processing data; wherein the second processing part makes the pixel density of the second processing data consistent with the pixel density of the first processing data by tone conversion of the image data.

By the above-mentioned image processing apparatus, it is possible to improve image quality while degradation of capability of the apparatus is prevented.

According to another aspect of the present invention there is provided a An image processing method implemented by an image processing apparatus configured to generate a printing image for printing document data by a printer, including: a first step of generating first processing data having a resolution different from the resolution with respect to printing order for character data contained in the document data; a second step of generating second processing data having pixel density consistent with the pixel density of the first processing data for image data contained in the document data; and a printing image generating step of generating printing data by synthesizing the first processing data and the second processing data; wherein the second processing step makes the pixel density of the second processing data consistent with the pixel density of the first processing data by tone conversion of the image data.

According to other aspect of the present invention there is provided an image processing program product where an image processing program is contained, and the program makes a computer implement an image processing method, the method including a first step of generating first processing data having a resolution different from the resolution with respect to a printing order for character data contained in the document data; a second step of generating second processing data having a pixel density consistent with the pixel density of the first processing data for image data contained in the document data; and a printing image generating step of generating printing data by synthesizing the first processing data and the second processing data; wherein the second processing step makes the pixel density of the second processing data consistent with the pixel density of the first processing data by tone conversion of the image data.

Other objects, features, and advantages of the present invention will become more apparent from the following detailed description when read in conjunction with the accompanying drawings.

BEST MODE FOR CARRYING OUT THE INVENTION

A description of the present invention and details of drawbacks of the related art are now given, with reference to FIG. 1 through FIG. 6, including embodiments of the present invention.

An image processing apparatus whereby image qualities of characters can be improved in a printing process by increasing resolution of the characters is discussed below.

Resolutions of graphics (drawings) and images are not increased. If resolutions of all of objects (characters, graphics, and images) are increased, processing capability is degraded. Especially, in the case of the image, contribution to improvement of the image quality by increase of the resolution cannot be frequently found.

If the resolution of the characters is different from the resolution of the graphics and the images, inconsistency of the image density may be generated and therefore it may not be possible to generate a single image by properly synthesizing them.

Accordingly, in the embodiment of the present invention, in the graphics or the images, not resolution but tone is expanded so that consistency with the pixel density of the characters can be maintained.

Figure 1:
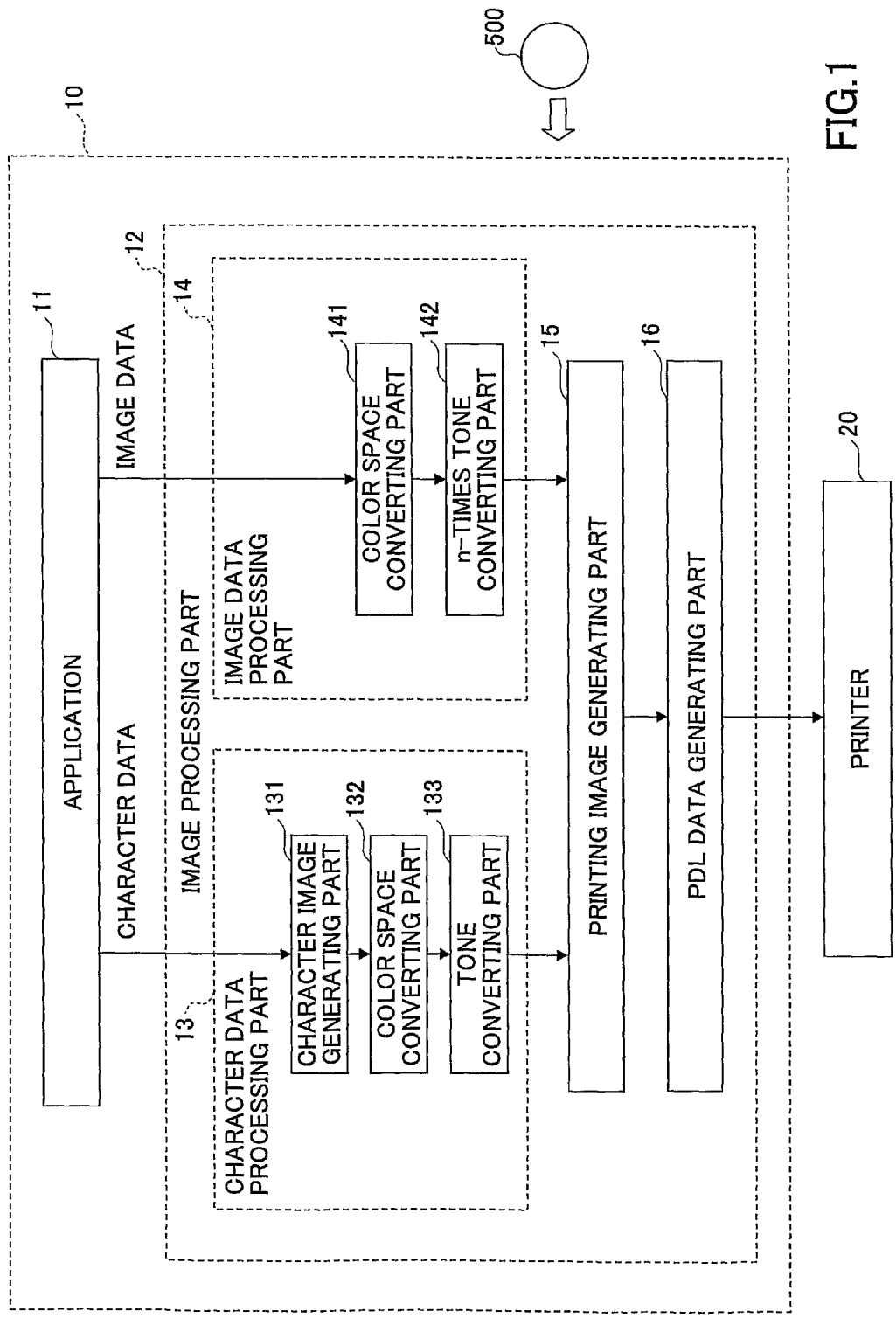
FIG. 1 is a block diagram showing a functional structure of an image processing apparatus of an embodiment of the present invention.

FIG. 1 is a block diagram showing a functional structure of an image processing apparatus of an embodiment of the present invention.

Referring to FIG. 1, the image processing apparatus 10 is a general purpose computer such as a PC (Personal Computer). An application 11, an image processing part 12, and others are installed in the image processing apparatus 10.

A program installed in the image processing apparatus 10 is loaded in a memory and the program is processed by a CPU (Central Processing Unit) so that the application 11, the image processing part 12, and others are realized. The program may be downloaded via a network or may be installed from a recording medium 500 such as a CD-ROM.

The application 11 is a general purpose application for forming document data that compose a printing subject, such as word processor software or spreadsheet software. By using the application 11, it is possible to form a document including plural kinds of objects such as characters, graphics (drawings), and image data.

The image processing part 12 is generally called a printer driver. The image processing part 12 implements an image process necessary for making a printer 200 such as an inkjet printer print the document data formed by the application. The image processing part 12 includes a character data processing part 13, an image data processing part 14, a printing image generating part 15, a PDL (Page Description Language) data generating part 16, and others. The image processing part 12 may be installed in the printer 20.

The character data processing part 13 includes a character data generating part 131, a color space converting part 132, a tone converting part 133, and others. The character data processing part 13 implements an image process for printing character data (character object) in the document data.

Here, the character data are defined as data for expressing each character by a character code.

The character data generating part 131 converts the character data by the character code to character image data that are data of the RGB (Red-Green-Blue) color space. In a case where the resolution required as the printing resolution (resolution with respect to printing order) is lower than the resolution of the printer 20 (maximum resolution at which the printer 20 can print), the character data generating part 131 generates the character image data in a main scanning direction at a resolution (maximum resolution at which the printer 20 can print) higher than the printing resolution.

Here, the resolution with respect to the printing order is defined as the resolution set in the printer driver at the time of the printing order by the user.

Depending on the printer driver, resolution may not be designated clearly. For example, selection is required from choices of "image quality priority", "capability priority", and others. Even if each of them is selected, this is interpreted as resolution, and resolution with respect to printing order is maintained.

The color space converting part 132 converts the color space of the character image data from RGB to CMYK(8). Here, (8) of CMYK(8) indicates tone. In other words, CMYK (8) indicates a color space having 8 bits tone (256 tones) for each of CMYK (Cyan, Magenta, Yellow, Black).

Thus, in this embodiment, the CMYK color space of n-bits tones is expressed as CMYK(n). Here, character image data converted to CMYK are defined as "character CMYK data".

The tone converting part 133 converts the tone of the character CMYK data by the CMYK(8) to a value corresponding to the printer 20, based on a halftone display method such as a density pattern method, a dithering method or an error diffusion method. The character CMYK data that are tone-converted by the tone converting part 133 are maintained in a memory of the image processing apparatus 10.

The image data processing part 14 includes a color space converting part 141, an n-times tone converting part 142, and others. The image data processing part 14 implements an image process for printing with respect to image data (an image object) in the document data.

Here, the image data are defined as raster type data and include bit map, TIFF (Tagged Image File Format), JPEG (Joint Photographic Experts Group), GIF (Graphics Interchange Format), and others. For example, in a case where data (a photo) taken by a digital camera are attached in the document data, the data are identified as image data.

The color space converting part 141 converts the color space of the image data from RGB to CMYK(8). The image data converted to CMYK are defined as image CMYK data.

The n-times tone converting part 142, based on a halftone display method, converts the tone of the image CMYK data by the CMYK(8) to n-times the tone of the printer 20.

Here, the value of "n" depends on that the resolution in the main scanning direction of the character image data being expanded by the character image data generating part 131 to how many times of the required printing resolution. More specifically, the value of "n" is the same value as the multiple of the resolution in the main scanning direction of the character image data to equal the resolution required as the printing resolution. Therefore, for example, in a case where the main scanning direction of the character image data is expanded two times, the n-times tone converting part 142 expands the tone of the image CMYK data two time to equal to the tone of the printer 20.

The reason why the n-times tone converting part 142 performs such tone conversion is to make pixel densities (bit number per one inch) of the character CMYK data and the image CMYK data consistent with each other. In other words, expansion of resolution in the main scanning direction of the image data is not performed in the image data processing part 14. Therefore, in this case, a difference of the pixel density from the character image data is caused. In the case where the pixel density is different, synthesizing of them becomes difficult.

The image CMYK data that are tone-converted by the tone converting part 142 are held in the memory of the image processing apparatus 10.

Although a process of graphics (drawings) in the document data is not referred to in FIG. 1, the graphic can be treated, the same as the image data, as data other than character data. Accordingly, in the following explanation, it can be assumed that the graphics are treated the same as the image data.

The printing image generating part 15 generates a printing image by synthesizing image data generated for every object by the character data processing part 13 and the image data processing part 14. In this case, since the pixel densities of the character data CMYK data and the image CMYK data are consistent with each other, the printing image processing part 15 can synthesize both types of image data by simple bit operations.

The PDL data generating part 16 generates PDL data including a command for making the printer 20 print the printing data generated by the printing image processing part 15. The PDL data are transmitted to the printer 20. The printer 20 interprets the PDL data so that the printing image is printed on a printing sheet.

Figure 2:
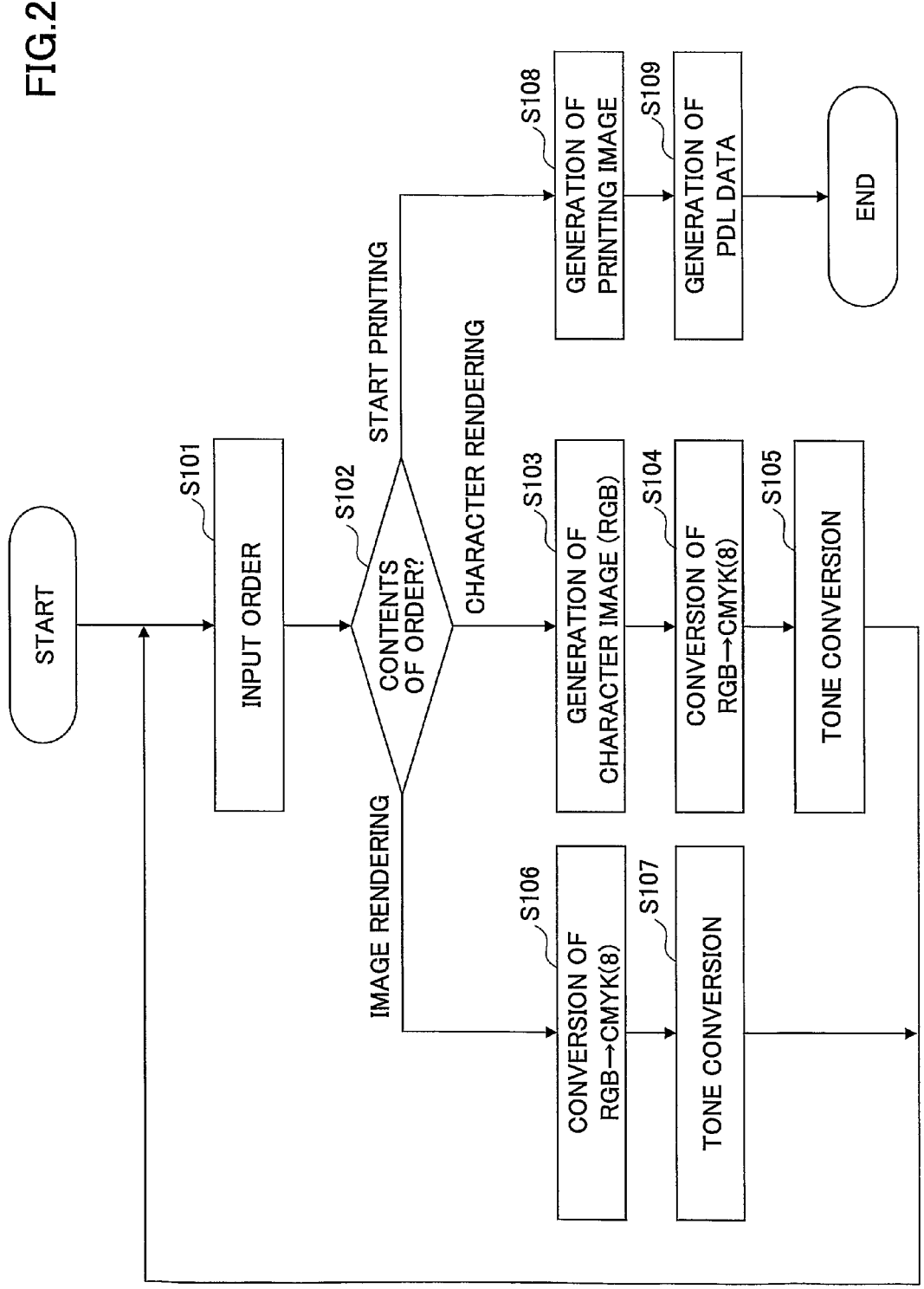
FIG. 2 is a flowchart for explaining process steps implemented by an image processing part.
Figure 3:
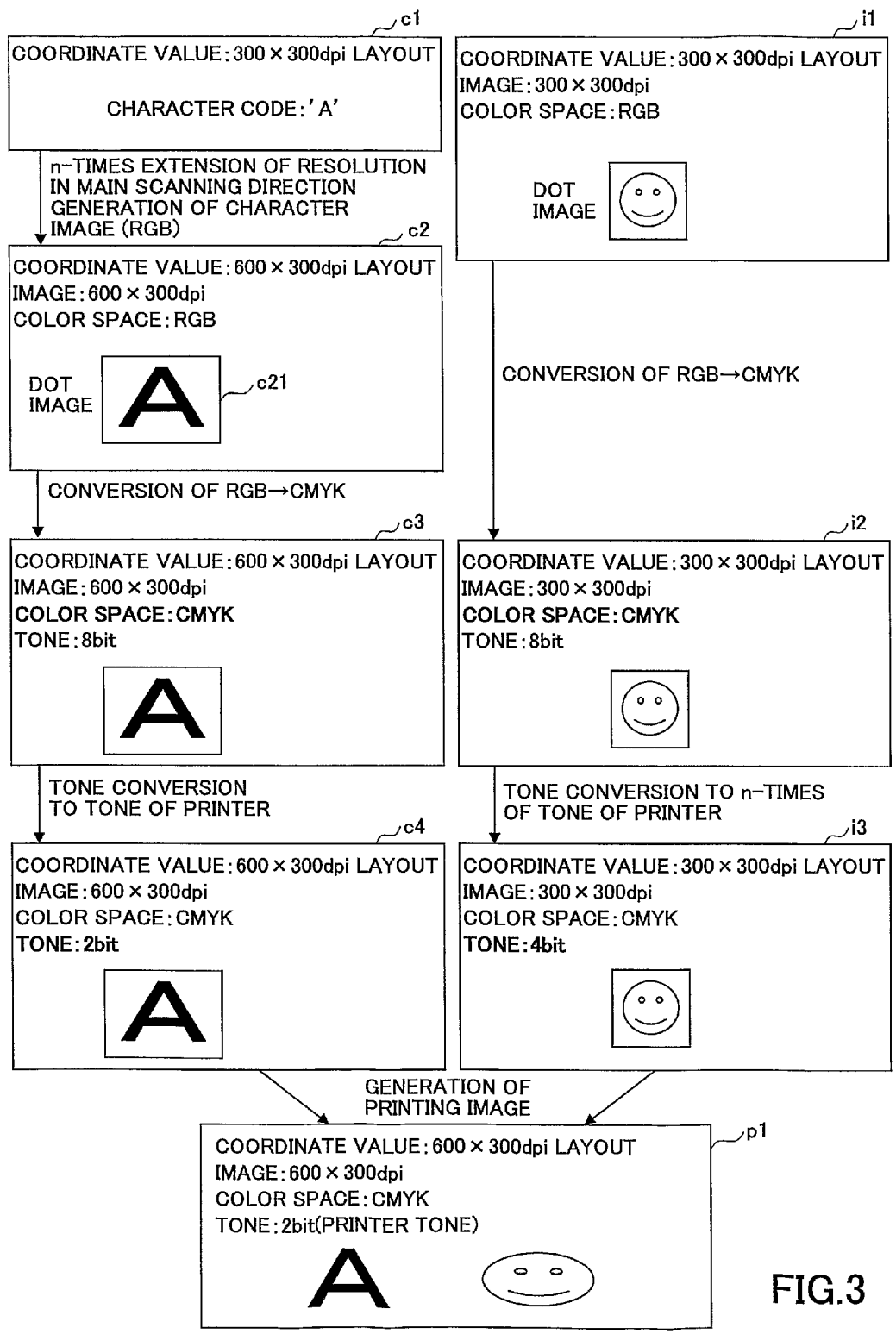
FIG. 3 is a view for explaining data conversion corresponding to a process by the image processing part.

Next, process steps of the image processing part 12 of the image processing apparatus 10 shown in FIG. 1 are discussed with reference to FIG. 2 and FIG. 3. Here, FIG. 2 is a flowchart for explaining process steps implemented by the image processing part 12. FIG. 3 is a view for explaining data conversion corresponding to a process by the image processing part 12.

In order to explain the process steps shown in FIG. 2 in detail, it is assumed that resolution of the printer 20 is 600×300 dpi and resolution of the printing order is 300×300 dpi. An example where the tone conversion is made based on the dithering method is discussed as a concrete example of the halftone display method.

When the application 11 receives an order with respect to printing the document data from the user, a rendering order is input to the image processing part 12 in order in step S101.

This order is input by the OS (Operating System). For example, in a case where the OS is Windows (registered trademark), the application 11 calls, based on the printing order from the user, the function interface GDI (Graphics Device Interface). By calling the GDI, rendering data that can be interpreted by the OS such as EMF (Enhanced Meta File) data, are generated based on the resolution of the printing order. A rendering command is included in the rendering data for every object of the document data.

The OS interprets the rendering data so as to input various kinds of the rendering order to the image processing part 12. Under the Windows (registered trademark) atmosphere, this order is input by calling the interface DDI (Device Driver Interface). For example, interfaces are distinguished from each other for every kind of object included in the document data such as a rendering order of characters, a rendering order of graphic, and a rendering order of image data. Therefore, the image processing part 12 can distinguish an object to be processed based on called order.

In a case where input order is rendering of the character data (character object), namely "CHARACTER RENDERING" in step S102, for example, character data c1 shown in FIG. 3 are input to the character data processing part 13. The character data c1 indicate a character code of character "A".

In this embodiment, since it is assumed that the resolution of the printing order is 300×300 dpi, a coordinate value of the character "A" is based on layout at resolution of 300×300 dpi.

Based on input of the character data c1, the character image generating part 131 of the character data processing part 13 converts the character "A" by the character code to image data of the RGB color space in step S102.

Here, the resolution of the printing order is 300×300 dpi and the resolution of the printer 20 is 600×300 dpi and. Therefore, the character image generating part 131 generates the character image data of the character "A" at the resolution of 600×300 dpi that is two times the resolution of the printing order in the main scanning direction.

Since the character data are generated directly and at a resolution higher than that of the character code, the character data have a high image quality. It is not always necessary to make the resolution in the main scanning direction be consistent with the resolution of the printer 20. For example, in a case where the resolution of the printer 20 is 1200×300 dpi, the resolution in the main scanning direction may be 600 dpi, 900 dpi, 1200 dpi, or the like.

As a result of the process of step S103 by the character image generating part 131, character image data c2 (see FIG. 3) are generated based on the character data c1. The character data c2 are image data having a color space of RGB and resolution of 600×300 dpi. A dot image c21 indicated in the character image data c2 of FIG. 3 indicates a dot image of the character image data c2.

In the meantime, a character "A" is expanded two times in the main scanning direction in the dot image c21. This is because the ratio of resolutions in the main scanning direction and the sub-scanning directions of the character image data c2 is 2:1. Accordingly, when printing is actually done, 2 dots in the main scanning direction have the same length as 1 dot in the sub-scanning direction and therefore the configuration of the character "A" is not expanded in the main scanning direction.

Next, the color space converting part 132 of the character data processing part 13 converts the color space of the character image data c2 from RGB to CMYK(8) so that character CMYK data c3 are generated in step S104. In the example shown in FIG. 3, the character CMYK data c3 are image data having a color space of CMYK(8) and resolution of 600×300 dpi.

Next, the tone converting part 133 of the character data processing part 13 converts the tone of the character CMYK data c3 to tones (2 bits=4 tones) of the printer 20 by dithering so that character CMYK data c4 are generated in step S105. In the example shown in FIG. 3, the character CMYK data c4 are image data having a color space of CMYK(2) and resolution of 600×300 dpi. In the printer 20, existence and size (small, medium, large) of an ink drop are determined based on the tone value of 4 tones of each dot.

The character CMYK data c4 that are generated by the tone converting part 133 are held in the memory of the image processing apparatus 10.

On the other hand, in a case where the input order is rendering the image data (image object), namely "IMAGE RENDERING" in step S102, for example, image data i1 shown in FIG. 3 are input to the image data processing part 14. The image data i1 are image data of 300×300 dpi attached to the document data.

Based on input of the character data c1, the color space converting part 141 of the image data processing part 14 converts the color space of the image data i1 from RGB to CMYK(8) so that image CMYK data i2 are generated in step S106. In the example shown in FIG. 3, the image CMYK data i2 are image data having tone of 8 bits and resolution of 300×300 dpi.

Next, the n-times tone converting part 142 of the image data processing part 14, by dithering method, converts the tone of the image CMYK data i2 to n times tone (2 bits) of the printer 20 so that image CMYK data i3 are generated in step S107.

Here, the resolution in the main scanning direction is expanded 2 times by the character image generating part 131. Accordingly, the image CMYK data i3 generated in step S105 have tone of 4 bits that are two times the tone (2 bits) of the printer 20 and resolution of 300×300 dpi.

The image CMYK data i3 that are generated by the tone converting part 133 are held in the memory of the image processing apparatus 10.

Processes of the above-discussed step S101 through step S107 are repeated for all of objects included in the document data. If the rendering process for all of the objects is completed, the printing order is input to the image processing part 12 ("START PRINTING" of step S102).

Based on the order to start printing, the printing image generating part 15 synthesizes the image data held in the memory for every object so that the printing image is generated in step S108. In the example shown in FIG. 3, the character CMYK data c4 and the image CMYK data i3 are synthesized so that a printing image p1 is generated.

In this case, resolution of the character CMYK data c4 is 600×300 dpi and resolution of the image CMYK data i3 is 300×300 dpi. In other words, the resolution of the character CMYK data c4 in the main scanning direction is two times. However, the tone of the image CMYK data i3 is 4 bits and twice the tone of the character CMYK data c4. Accordingly, pixel densities of them are consistent with each other.

Therefore, the printing image generating part 15 treats the image CMYK data i3 as image data having resolution of 600×300 dpi and tone of 2 bits. The printing image generating part 15 synthesizes the character CMYK data c4 and the image CMYK data i3 by a simple synthesizing of bits. As a result of this, printing image p1 having resolution of 600×300 dpi and tone of 2 bits is generated.

In the printing image p1, an image of a face as well as character "A" is expanded two times in the main scanning direction. This is because the printing image p1 is drawn as a dot image while the ratio of resolutions in the main scanning direction and the sub-scanning directions of the printing image p1 is 2:1. Accordingly, when printing is actually done, 2 dots in the main scanning direction has the same length as 1 dot in the sub-scanning direction and therefore the configuration of the character "A" and the image of the face are not expanded in the main scanning direction.

Next, the PDL data generating part 16 generates PDL data including a command for making the printer 20 print the printing data p1 generated by the printing image processing part 15 in step S109.

The PDL data are transmitted to the printer 20. The printer 20 interprets the PDL data so that the printing image is printed on a printing sheet. Here, since image processing is done for the character at 600×300 dpi, printing is done with high quality.

Next, tone conversion by the character data processing part 13 (tone converting part 133) in step S105 and tone conversion by the image data processing part 14 (n-times tone converting part 142) in step S107 are discussed.

In this embodiment, it is assumed that the printing image of 600×300 dpi×2 bit/pixel is finally generated. Therefore, tone conversion is done by using a dither pattern for 600×300 dpi×2 bit/pixel. The dither pattern may be changed for every object or may be the same. In this embodiment, a dither pattern discussed below is used.

Figure 4:
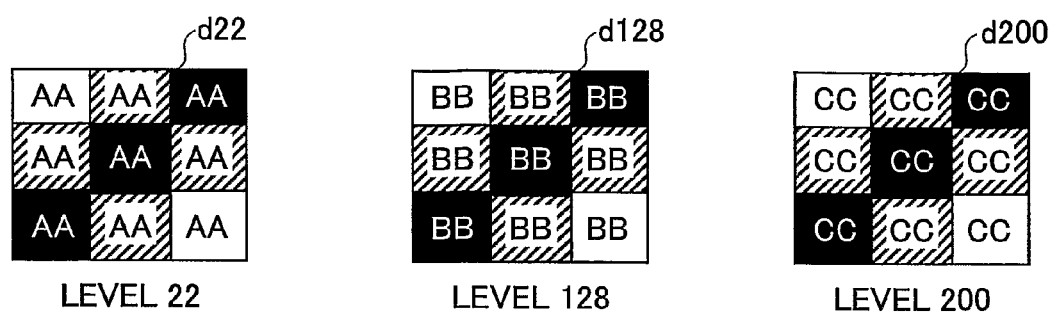
FIG. 4 is a view showing examples of dither patterns.

FIG. 4 is a view showing examples of the dither patterns.

In the example shown in FIG. 4, as a part of the dither patterns, a dither pattern d22 of level 22, a dither pattern d128 of level 128, and a dither pattern d200 of level 200 are shown. In the example shown in FIG. 4, "A" is repeated twice so that "AA" is drawn; "B" is repeated twice so that "BE" is drawn; and "C" is repeated twice so that "CC" is drawn. This repeating number expresses the number of bits of the tone, namely 2 bits. In other words, the dither pattern shown in FIG. 4 is used for converting 8 bits (256 tones) to 2 bits (4 tones).

Figure 5:
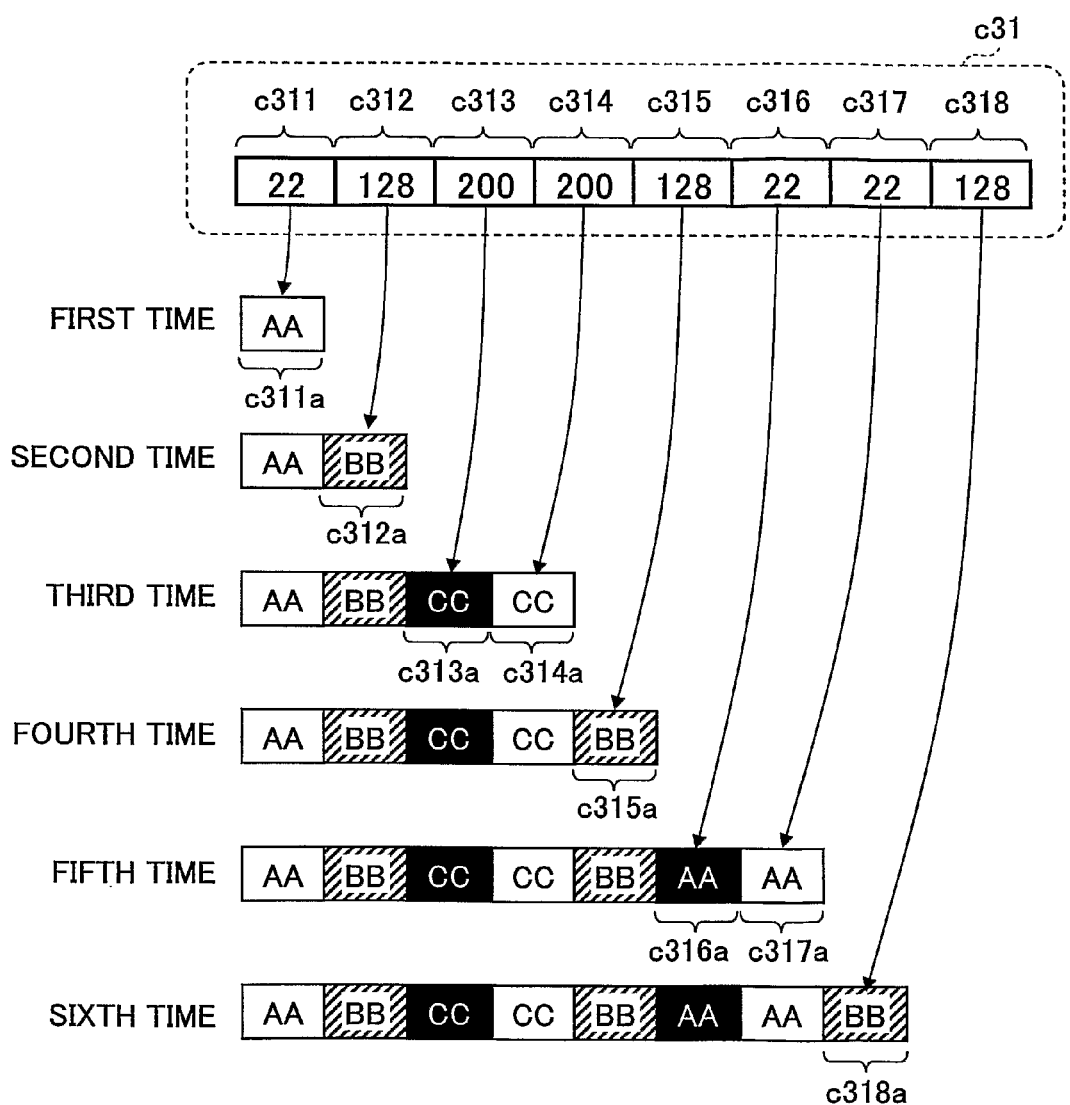
FIG. 5 is a view for explaining tone conversion of character CMYK data.

FIG. 5 is a view for explaining tone conversion of the character CMYK data.

FIG. 5 corresponds to the tone converting process in step S105. In the example shown in FIG. 5, data c31 indicates data of the first 8 bits at a first line of the character CMYK data c3. Since the tone of the character CMYK data c3 is 8 bits, each dot (dot c311 through dot c318) of the data c31 is formed by 8 bits. The numerical value indicated in each dot shows the tone value of the dot.

In the example shown in FIG. 5, dot c311 is a subject of the first time tone conversion. The tone value of the dot c311 is "22" and therefore conversion to dot c311a of four tones (2 bits) is made based on the dither pattern d22 of level 22.

Other dots are also converted to a dot of 2 bits based on the dither pattern corresponding to the tone value of the dot. Accordingly, dot c312, dot c313, dot c314, dot c315, dot c316, dot c317, and dot c318 are respectively converted to dot c312a, dot c313a, dot c314a, dot c315a, dot c316a, dot c317a, and dot c318a. At the third and fifth conversions, two dots are converted at one time. This is because conversion is done at one time by using the same dither pattern in a case where the dot having the same tone value continues.

Thus, in the graduation conversion of the character CMYK data c3, one dot of 256 tones (8 bits) is converted to one dot of 4 tones (2 bits).

Figure 6:
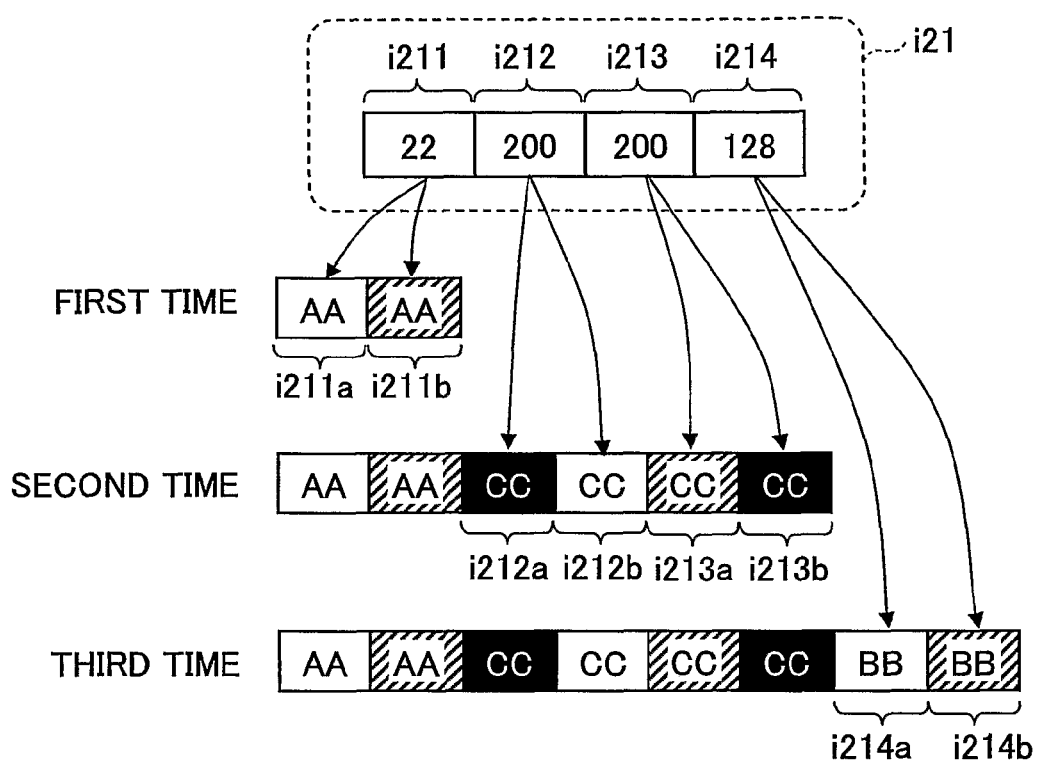
FIG. 6 is a view for explaining tone conversion of image CMYK data.

FIG. 6 is a view for explaining tone conversion of the image CMYK data.

In other words, FIG. 6 corresponds to the tone converting process in step s107. In the example shown in FIG. 6, data i21 indicate data of first 4 dots of the first line of the image CMYK data i2. Since the tone of the image CMYK data i2 is 8 bits, each dot of the data i21, namely dot i211 through dot i214, is formed by 8 bits. The numerical value indicated in each dot of FIG. 6, as well as that of FIG. 5, indicates the tone value of the dot.

In the example shown in FIG. 6, the dot i211 is a subject of the first time tone conversion. Since the tone value of the dot i211 is "22", conversion to the dot i211a and the dot i211b of four tones (2 bits) are made based on the dither pattern d22 of level 22. In other words, one dot is converted to 2 dots (4 bits).

The dot i211a is a dot corresponding to the position of the dot 211 in the dither pattern d22. The dot 211b is a dot neighboring at a right side of the dot corresponding to the position of the dot 211 in the dither pattern d22.

The reason why one dot of 256 tones is converted to 2 dots of four tones (4 bits) in this embodiment is that the value of "n" of the n-times tone converting part 142. Therefore, if the value of "n" is 4, one dot of 256 tones is converted to 4 dots of 4 tones.

In this case, the converted dot is extracted from a dot corresponding to the original dot in the dot pattern. Other dots of the data i211 are also converted to 2 dots (4 bits) where one dot is four tones. Therefore, dot i212 is converted to dot i212a and dot i212b; dot i213 is converted to dot i213a and dot i213b; and dot i214 is converted to dot i214a and dot i214b.

The reason why dot 212 and dot i213 are converted at one time at the second tone conversion is that tone values of these dots are the same. Thus, the image CMYK data i2 are converted to the image data of two time tone (4 bits) of the character CMYK data c3.

The number of dots of data after the sixth conversion in FIG. 5 is done and data after the third conversion in FIG. 6 is done are consistent with each other. Since each of the number of bits per dot is 2 bits, the numbers of both bits, namely pixel densities are consistent with each other. In other words, the pixel densities of data after tone conversion of 8 dots of the character CMYK data c3 and data after tone conversion of 4 dots of the image CMYK data i2 are consistent with each other.

Therefore, according to the tone converting method shown in FIG. 5 and FIG. 6, the pixel densities of data (character CMYK data c4) after tone conversion of the character CMYK data c3 of 600 dpi in the main scanning direction and data (image CMYK data i3) after tone conversion of the image CMYK data i2 of 300 dpi are consistent with each other.

When the image CMYK data i3 and the character CMYK data c4 are synthesized after the tone modulation is performed, the image CMYK data i3 are treated as the image data having resolution of 600×300 dpi and tone of 2 bits. Therefore, it is necessary to do tone conversion of the image CMYK data i3 by a dither pattern expected to be treated as such image data.

In other words, for the dither pattern used for tone conversion, inconsistency with the rendering contents is not generated when the image CMYK data i3 are treated as 600×300 dpi×2 bit/pixel.

As discussed above, according to the image processing apparatus 10 (image processing part 12) of this embodiment, for the character data (character object) in the document data, the image data are generated with high precision. Therefore, regarding characters, it is possible to obtain good printing results with high quality.

On the other hand, with respect to the data other than character data in the document data (image data, graphics, or the like), it is possible to achieve consistency with the pixel density of the character image data by tone conversion.

Therefore, with respect to the image data or the like, it is not necessary to perform an expanding process of resolution so that an increase of processing workload and decrease of processing speed can be prevented.

In addition, the timing when the gradation conversion is made is after the color space is changed and before the image data of each object are synthesized (namely a latter half of the image processing step). Therefore, it is possible to prevent increase of processing workload.

Even if original image data of 300×300 dpi are expanded to 600×300 dpi, improvement of image quality cannot be obtained. Accordingly, in the image processing of this embodiment, by properly using characteristics of each object, it is possible to properly realize improvement of image quality and decrease of degradation of capability.

As discussed above, the embodiment of the present invention can provide an image processing apparatus, image processing method and image processing program product whereby image quality can be improved while degradation of capability of the apparatus is prevented.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

This patent application is based on Japanese Priority Patent Application No. 2006-178295 filed on Jun. 28, 2006 and Japanese Priority Patent Application No. 2007-147353 filed on Jun. 1, 2007, the entire contents of which are hereby incorporated by reference.

The invention claimed is:

1. An image processing apparatus configured to generate a printing image for printing document data having a first document resolution and a second document resolution equal to the first document resolution by a printer having a first print resolution in a main scanning direction and a second print resolution in a sub scanning direction different from the first print resolution, comprising:

a first processing part configured to generate first processing data of character data contained in the document data so that a proportion between a first resolution and a second resolution is equal to a proportion between the first print resolution and the second print resolution;

a second processing part configured to generate second processing data of image data contained in the document data having a same pixel density as a pixel density of the first processing data by changing the first document resolution and the second document resolution equal to the first document resolution, the pixel density being equal to the first print resolution times the second print resolution times a bit number of tone; and a printing image generating part configured to generate printing data having the first print resolution and the first print resolution by synthesizing the first processing data and the second processing data, the printing image generating part generating the printing data having a same pixel density as the pixel densities of the first processing data and of the second processing data, wherein the second processing part makes the pixel density of the second processing data consistent with the pixel density of the first processing data by tone convers on of the image data, and performs the tone conversion of the image data so as to have a tone corresponding to a change of the changed first and second document resolutions.

2. The image processing apparatus as claimed in claim 1, wherein the first processing part generates the first processing data having the resolution expanding in a main scanning direction compared to the resolution of the printing order, for the character data.

3. The image processing apparatus as claimed in claim 1, wherein the second processing part performs the tone conversion of the image data based on a halftone display method.

4. The image processing apparatus as claimed in claim 1, wherein the first print resolution is 600 dpi and the second print resolution is 300 dpi.

5. An image processing apparatus configured to generate printing image for printing document data having a first document resolution and a second document resolution equal to the first document resolution by a printer having a first print resolution in a main scanning direction and a second print resolution in a sub scanning direction different from the first print resolution, comprising:

first processing means for generating first processing data of character data contained in the document data so that a proportion between a first resolution and a second resolution is equal to a proportion between the first print resolution and the second print resolution;

second processing means for generating second processing data of image data contained in the document data having a same pixel density as a pixel density of the first processing data by changing the first document resolution and the second document resolution equal to the first document resolution, the pixel density being equal to the first print resolution times the second print resolution times a bit number of tone; and printing image generating means for generating printing data having the first print resolution and the first print resolution by synthesizing the first processing data and the second processing data, the printing image generating means generating the printing data having a same pixel density as the pixel densities of the first processing data and of the second processing data, wherein the second processing means makes the pixel density of the second processing data consistent with the pixel density of the first processing data by tone conversion of the image data, and performs the tone conversion of the image data so as to have a tone corresponding to a change of the changed first and second document resolutions.

6. The image processing apparatus as claimed in claim 5, wherein the first processing means generates the first processing data having the resolution expanding in a main scanning direction compared to the resolution of the printing order, for the character data.

7. The image processing apparatus as claimed in claim 5, wherein the second processing means performs the tone conversion of the image data based on a halftone display method.

8. An image processing method implemented by an image processing apparatus configured to generate a printing image for printing document data having a first document resolution and a second document resolution equal to the first document resolution by a printer having a first print resolution in a main scanning direction and a second print resolution in a sub scanning direction different from the first print resolution, comprising:

a first step of generating first processing data of character data contained in the document data so that a proportion between a first resolution and a second resolution is equal to a proportion between the first print resolution and the second print resolution;

a second step of generating second processing data of image data contained in the document data having a same pixel density as a pixel density of the first processing data by changing the first document resolution and the second document resolution equal to the first document resolution, the pixel density being equal to the first print resolution times the second print resolution times a bit number of tone; and a printing image generating step of generating printing data having the first print resolution and the first print resolution by synthesizing the first processing data and the second processing data, the printing image generating step generating the printing data having a same pixel density as the pixel densities of the first processing data and the second processing data, wherein the second processing step makes the pixel density of the second processing data consistent with the pixel density of the first processing data by tone conversion of the image data, and performs the tone conversion of the image data so as to have a tone corresponding to a change of the changed first and second document resolutions.

9. The image processing method as claimed in claim 8, wherein the first processing step generates the first processing data having the resolution expanding in a main scanning direction compared to the resolution of the printing order, for the character data.

10. The image processing method as claimed in claim 8, wherein the second processing step performs the tone conversion of the image data based on a halftone display method.

* * * * *